United States Patent
Li et al.

(10) Patent No.: US 12,503,540 B2
(45) Date of Patent: Dec. 23, 2025

(54) AQUEOUS DISPERSION OF POLYMER ADDITIVE AND PROCESS FOR PREPARING THE SAME

(71) Applicant: Dow Global Technologies LLC, Midland, MI (US)

(72) Inventors: Hu Li, Shanghai (CN); Xiangting Dong, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 481 days.

(21) Appl. No.: 18/029,122

(22) PCT Filed: Oct. 28, 2020

(86) PCT No.: PCT/CN2020/124306
§ 371 (c)(1),
(2) Date: Mar. 29, 2023

(87) PCT Pub. No.: WO2022/087876
PCT Pub. Date: May 5, 2022

(65) Prior Publication Data
US 2023/0374187 A1 Nov. 23, 2023

(51) Int. Cl.
*C08F 2/30* (2006.01)
*C08F 283/12* (2006.01)
*C09D 151/08* (2006.01)

(52) U.S. Cl.
CPC ............ *C08F 283/124* (2013.01); *C08F 2/30* (2013.01); *C09D 151/085* (2013.01)

(58) Field of Classification Search
CPC ..... C08F 283/124; C08F 2/30; C09D 151/085
See application file for complete search history.

(56) References Cited

U.S. PATENT DOCUMENTS

| | | | |
|---|---|---|---|
| 7,723,426 B2 | 5/2010 | Cai et al. | |
| 2005/0249958 A1 | 11/2005 | Kania et al. | |
| 2015/0125500 A1 | 5/2015 | Watanabe et al. | |
| 2016/0122575 A1 | 5/2016 | Yang et al. | |

FOREIGN PATENT DOCUMENTS

| | | | |
|---|---|---|---|
| CN | 111718629 | | 9/2020 |
| EP | 0565093 A1 | | 10/1993 |
| EP | 0757059 A1 | | 2/1997 |
| EP | 785034 | | 7/1997 |
| GB | 1241509 | | 8/1971 |
| JP | H05140255 A | | 6/1993 |
| JP | H0912655 A | | 1/1997 |
| JP | H09208647 A | | 8/1997 |
| JP | H10337970 A | | 12/1998 |
| WO | 2014190515 | | 12/2014 |
| WO | 2018119721 | | 7/2018 |
| WO | 2020010564 | | 1/2020 |
| WO | WO-2020010564 A1 | * | 1/2020 ............... C09D 5/08 |
| WO | 2020082257 A1 | | 4/2020 |
| WO | 2020248189 | | 12/2020 |

OTHER PUBLICATIONS

Search Report and Written Opinion from corresponding International Application No. PCT/CN2020/124306.
Supplementary European Search Report for the corresponding European Application No. EP20959040, Date of Completion: Jul. 17, 2024; 2 pages.

* cited by examiner

*Primary Examiner* — Jiangtian Xu
(74) *Attorney, Agent, or Firm* — CANTOR COLBURN LLP

(57) ABSTRACT

An aqueous dispersion of a polymer additive having a weight average molecular weight of from 2,000 to 25,000 g/mol and comprising, by weight based on the weight of the polymer additive, (i) from 20% to 85% of structural units of an ethylenically unsaturated siloxane monomer; (ii) from 0.1% to 10% of structural units of an ethylenically unsaturated functional monomer carrying at least one functional group selected from an amide, ureido, carboxyl, carboxylic anhydride, hydroxyl, phosphorus acid, or sulfonic acid group, a salt thereof, or mixtures thereof; and (iii) from 5% to 79.9% of structural units of an additional ethylenically unsaturated nonionic monomer. The aqueous dispersion has a coagulum content less than 2,000 ppm after filtration through a 44 micron sieve. A coating composition comprises the aqueous dispersion of the polymer additive can provide coatings with anti-corrosion and/or stain removal properties.

10 Claims, No Drawings

AQUEOUS DISPERSION OF POLYMER ADDITIVE AND PROCESS FOR PREPARING THE SAME

FIELD OF THE INVENTION

The present invention relates to an aqueous dispersion of a polymer additive and a process for preparing the same.

INTRODUCTION

Aqueous or waterborne coating compositions are becoming increasingly more important than solvent-based coating compositions for less environmental problems. Aqueous coating compositions are usually formulated using emulsion polymers as binders, which are typically prepared by emulsion polymerization of conventional monomers such as butyl acrylate, 2-ethylhexyl acrylate, styrene, methyl methacrylate or mixtures thereof. Incorporation of more hydrophobic monomers such as ethylenically unsaturated siloxane monomers into the polymer backbone of the binders during emulsion polymerization can be one approach to further improve coatings' performance, such as anti-corrosion properties. However, a large amount of coagulum (e.g., more than 2,000 ppm) may be formed in a conventional emulsion polymerization process when ethylenically unsaturated siloxane monomers are included into binders in an amount of more than 4.5% by weight of total monomers, which limits applications of aqueous silicone-acrylic hybrid polymer binders. Aqueous coating compositions may have other desirable properties such as stain resistance in exterior applications.

Therefore, it is desirable to provide an aqueous dispersion without the aforementioned problems for binders, that is particularly suitable for coating compositions and can provide coatings with improved performance such as anti-corrosion and stain removal properties.

SUMMARY OF THE INVENTION

The present invention provides a novel aqueous dispersion of a polymer additive without the aforementioned problems. A process for preparing such aqueous dispersion of the polymer additive can give the aqueous dispersion with a low coagulum content, for example, less than 2,000 parts per million (ppm) after filtration through a 44 micron sieve. Incorporation of a specific amount of the aqueous dispersion of the polymer additive into a coating composition can improve anti-corrosion and stain removal properties of coatings made therefrom.

In a first aspect, the present invention is an aqueous dispersion of a polymer additive with a weight average molecular weight of from 2,000 to 25,000 grams per mole (g/mol), wherein the polymer additive comprises, by weight based on the weight of the polymer additive,
  (i) from 20% to 85% of structural units of an ethylenically unsaturated siloxane monomer of formula (I), (II), or (III),

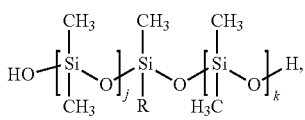

(I)

wherein, in formula (I), R is an ethylenically unsaturated group, and j and k are each independently in the range of from 0 to 100, and j+k=5 to 100;

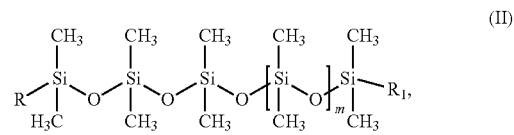

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

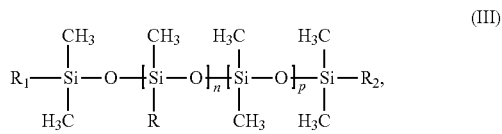

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100;
  (ii) from 0.1% to 10% of structural units of an ethylenically unsaturated functional monomer carrying at least one functional group selected from an amide, ureido, carboxyl, carboxylic anhydride, hydroxyl, phosphorus acid, or sulfonic acid group, a salt thereof, or mixtures thereof; and
  (iii) from 5% to 79.9% of structural units of an additional ethylenically unsaturated nonionic monomer;
  wherein the coagulum content of the aqueous dispersion is less than 2,000 ppm after filtration through a 44 micron sieve.

In a second aspect, the present invention is a process for preparing the aqueous dispersion of the first aspect. The process comprises:
  emulsion polymerization of a monomer mixture in the presence of a chain transfer agent, wherein the monomer mixture comprises, by weight based on the total weight of the monomer mixture, from 20% to 85% of the ethylenically unsaturated siloxane monomer, from 0.1% to 10% of the ethylenically unsaturated functional monomer, and from 5% to 79.9% of the additional monoethylenically unsaturated nonionic monomer, In a second aspect, the present invention is a coating composition comprising, by weight based on the total weight of the coating composition, (A) from 0.8% to 8% of the aqueous dispersion of the polymer additive of the first aspect, and (B) an emulsion polymer having a weight average molecular weight greater than 25,000 g/mol.

DETAILED DESCRIPTION OF THE INVENTION

"Aqueous" dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, and the like.

"Acrylic" as used herein includes (meth)acrylic acid, alkyl (meth)acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

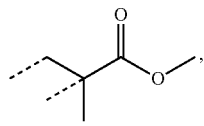

where the dotted lines represent the points of attachment of the structural unit to the polymer backbone.

The aqueous dispersion of the present invention comprises a polymer additive. The polymer additive comprises structural units of one or more ethylenically unsaturated siloxane monomer, preferably one or more (meth)acrylate functional siloxane. The ethylenically unsaturated siloxane monomer has the structure represented by formula (I), (II), or (III),

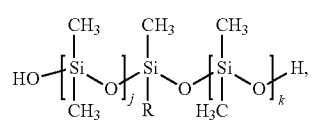

wherein, in formula (I), R is an ethylenically unsaturated group including, for example, —CH=CH$_2$, —R$_p$—OC(=O)CH=CH$_2$, or —R$_p$—OC(=O)C(CH$_3$)=CH$_2$, where R$_p$ is a C$_1$-C$_6$ bivalent hydrocarbon group, preferably, R is —CH$_2$CH$_2$CH$_2$OC(=O)CH=CH$_2$ or —CH$_2$CH$_2$CH$_2$OC(=O)C(CH$_3$)=CH$_2$; and j and k are each independently in the range of from 0 to 100, from 0 to 80, from 0 to 60, from 5 to 50, from 10 to 40, or from 10 to 20, and j+k=5 to 100, for example, from 5 to 50, from 8 to 50, from 10 to 40, from 10 to 30, or from 10 to 25;

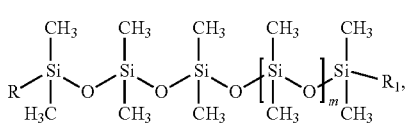

wherein, in formula (II), R is an ethylenically unsaturated group including, for example, —CH=CH$_2$, —R$_p$—OC(=O)CH=CH$_2$, or —R$_p$—OC(=O)C(CH$_3$)=CH$_2$, where R$_p$ is a C$_1$-C$_6$ bivalent hydrocarbon group, preferably, R is —CH$_2$CH$_2$CH$_2$OC(=O)CH=CH$_2$ or —CH$_2$CH$_2$CH$_2$OC(=O)C(CH$_3$)=CH$_2$; and R$_1$ is a hydroxyl, alkyl, aryl, alkoxyl, aryloxy, alkyl ether, or aryl ether group, preferably a hydroxyl group, or an alkyl, alkoxyl, or alkyl ether group having carbon atoms in the range of from 1 to 15, from 1 to 10, or from 1 to 5, for example, —CH$_3$, —OH, —OCH$_3$, or —OCH$_2$CH$_3$; and m is from 1 to 100, from 5 to 80, from 10 to 60, from 10 to 40, or from 10 to 20;

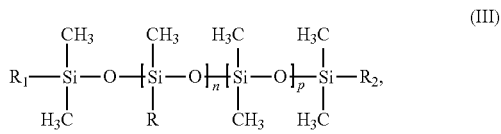

wherein, in formula (III), R is an ethylenically unsaturated group including, for example, —CH=CH$_2$, —R$_p$—OC(=O)CH=CH$_2$, or —R$_p$—OC(=O)C(CH$_3$)=CH$_2$, where R$_p$ is a C$_1$-C$_6$ bivalent hydrocarbon group, preferably, R is —CH$_2$CH$_2$CH$_2$OC(=O)CH=CH$_2$ or —CH$_2$CH$_2$CH$_2$OC(=O)C(CH$_3$)=CH$_2$; R$_1$ and R$_2$ are the same or different and each independently a hydroxyl, alkyl, aryl, alkoxyl, aryloxy, alkyl ether, or aryl ether group, preferably a hydroxyl group, or an alkyl, alkoxyl, or alkyl ether group having carbon atoms in the range of from 1 to 15, from 1 to 10, or from 1 to 5, for example, —CH$_3$, —OH, —OCH$_3$, or —OCH$_2$CH$_3$; and n is from 1 to 5, from 1 to 4, from 1 to 3, or from 1 to 2; and p is from 1 to 100, from 5 to 80, from 5 to 60, from 8 to 40, or from 8 to 20. Suitable commercially available ethylenically unsaturated siloxane monomers may include, for example, DOWSIL™ 32 methacrylate siloxane monomer available from The Dow Chemical Company (DOWSIL is a trademark of The Dow Chemical Company).

The polymer additive of the present invention may comprise, by weight based on the weight of the polymer additive, structural units of the ethylenically unsaturated siloxane monomer in an amount of 20% or more, 21% or more, 22% or more, 23% or more, 24% or more, 25% or more, 26% or more, 27% or more, 28% or more, 29% or more, 30% or more, 31% or more, 32% or more, 33% or more, 34% or more, 35% or more, 36% or more, 37% or more, or even 38% or more, and at the same time, 85% or less, 80% or less, 75% or less, 70% or less, 65% or less, 60% or less, 55% or less, 52% or less, 50% or less, 48% or less, 45% or less, 42% or less, or even 40% or less.

The polymer additive of the present invention comprises structural units of one or more ethylenically unsaturated functional monomer carrying at least one functional group selected from an amide, ureido, carboxyl, carboxylic anhydride, hydroxyl, phosphorous acid, or sulfonic acid group, a salt thereof, or mixtures thereof. Examples of suitable ethylenically unsaturated functional monomers comprise α,β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxy-functional alkyl (meth)acrylates such as hydroxyethyl (meth)acrylate and hydroxypropyl (meth)acrylate; ureido-functional monomers such as hydroxyethyl ethylene urea methacrylate, hydroxyethyl ethylene urea acrylate, such as SIPOMER WAM II available from Solvay, methylacrylamidoethyl ethylene urea, or mixtures thereof. Preferred ethylenically unsaturated functional monomers are selected from the group consisting of acrylic acid, sodium styrene sulfonate, acrylamide, methacrylamide, methacrylic acid, or mixtures hereof. The polymer additive may comprise, by weight based on the weight of the polymer additive, 0.1% or more, 0.2% or more, 0.3% or more, 0.4% or more, 0.5% or more, 0.6% or more, 0.7% or more, 0.8% or more, 0.9% or more, or even 1.0% or more, and at the same time, 10% or less, 9% or less, 8% or less, 7% or less, 6% or less, 5% or less, 4.5% or less, 4% or less, 3.5% or less, 3% or less, 2.5% or less, 2% or less, or even 1.5% or less of structural units of the ethylenically unsaturated functional monomer.

The polymer additive of the present invention comprises structural units of one or more additional monoethylenically unsaturated nonionic monomer that is other than the monomers described above. The term "nonionic monomer" herein refers to a monomer that does not bear an ionic charge between pH=1-14. The additional monoethylenically unsaturated nonionic monomer may include an acrylic monomer, a styrene monomer, a combination of acrylic and styrene monomers, a vinyl ester monomer, or a combination of ethylene and vinyl ester monomers, a vinyl silane monomer, or mixtures thereof. Examples of suitable acrylic monomers include alkyl esters of (meth)acrylic acids having from 2 to 30 carbon atoms or from 2 to 18 carbon atoms such as methyl acrylate, methyl methacrylate, ethyl acrylate, 2-ethylhexyl acrylate, butyl (meth)acrylate, iso-butyl (meth)acrylate, tert-butyl (meth)acrylate, decyl acrylate, isodecyl methacrylate, lauryl (meth)acrylate, and stearyl (meth)acrylate; cycloalkyl (meth)acrylates including cyclohexyl (meth)acrylate, methcyclohexyl (meth)acrylate, dihydrodicyclopentadienyl (meth)acrylate, trimethylcyclohexyl (meth)acrylate, t-butyl (meth)cyclohexyl acrylate, (meth)acrylate functional silanes including, for example, (meth)acryloxyalkyltrialkoxysilanes such as gamma-methacryloxypropyltrimethoxysilane and methacryloxypropyltriethoxysilane; 3-methacryloxypropylmethyldimethoxysilane; 3-methacryloxypropyltrimethoxysilane; 3-methacryloxypropyltriethoxysilane; or mixtures thereof. Examples of suitable styrene monomers styrene and substituted styrenes. Examples of suitable vinyl silane monomers include vinyl acetate, vinyl butyrate, vinyl versatate, or mixture thereof. Examples of suitable alkyl alkylvinyldialkoxysilanes; and vinyltrialkoxysilanes such as vinyltriethoxysilane and vinyltrimethoxysilane. Preferred additional ethylenically monounsaturated nonionic monomers are butyl acrylate, butyl methacrylate, methyl methacrylate, ethyl acrylate, 2-ethylhexyl acrylate, vinyl acetate, (meth)acrylate functional silanes, styrene, or mixtures thereof. The polymer additive may comprise, by weight based on the weight of the polymer additive, 5% or more, 10% or more, 15% or more, 20% or more, 25% or more, 30% or more, 35% or more, 40% or more, or even 45% or more, at the same time, 79.9% or less, 79% or less, 78% or less, 75% or less, 72% or less, 70% or less, 68% or less, 65% or less, 62% or less, 60% or less, 59% or less, or even 57% or less of structural units of the additional monoethylenically unsaturated nonionic monomer.

The polymer additive of the present invention may optionally comprise structural units of one or more multiethylenically unsaturated monomer that is different from the monomers described above. Examples of suitable multiethylenically unsaturated monomers include allyl (meth)acrylate, hexanediol di(meth)acrylate, ethylene glycol di(meth)acrylate, neopentyl glycol di(meth)acrylate, butanediol di(meth)acrylate, trimethylolpropane tri(meth)acrylate, divinyl benzene, allyl acetate, allyl (meth)acrylamide, allyl oxyethyl (meth)acrylate, crotyl (meth)acrylate, dicyclopentenyl (meth)acrylate, dicyclopentenyl ethyl(meth)acrylate, diallyl maleate, or mixtures thereof. The polymer additive may comprise, by weight based on the weight of the polymer additive, from zero to 5%, from zero to 2%, or from 0.1% to 1% of structural units of the multiethylenically unsaturated monomer.

Preferably, the polymer additive comprises, by weight based on the weight of the polymer additive, from 20% to 50% of structural units of the ethylenically unsaturated siloxane monomer, from 1% to 5% of structural units of the ethylenically unsaturated functional monomer, and from 45% to 79% of structural units of the additional monoethylenically unsaturated nonionic monomer.

The polymer additive of the present invention may have a weight average molecular weight ($M_w$) of 2,000 g/mol or more, 2,100 g/mol or more, 2,200 g/mol or more, 2,500 g/mol or more, 2,800 g/mol or more, 3,000 g/mol or more, 3,200 g/mol or more, 3,500 g/mol or more, 3,800 g/mol or more, 4,000 g/mol or more, 4,200 g/mol or more, 4,500 g/mol or more, 4,800 g/mol or more, 5,000 g/mol or more, 5,200 g/mol or more, or even 5,500 g/mol or more, and at the same time, 25,000 g/mol or less (i.e., ≤25,000 g/mol), 22,000 g/mol or less, 20,000 g/mol or less, 18,000 g/mol or less, 15,000 g/mol or less, 12,000 g/mol or less, 10,000 g/mol or less, 9,500 g/mol or less, 9,000 g/mol or less, 8,500 g/mol or less, or even 8,000 g/mol or less. $M_w$ may be determined by Gel Permeation Chromatography (GPC) analysis as described in the Examples section below.

The aqueous dispersion of the polymer additive of the present invention has a low coagulum content. "Low coagulum content" means a coagulum content of an aqueous dispersion of less than 2,000 ppm, preferably, less than 1,900 ppm, less than 1,800 ppm, less than 1,700 ppm, less than 1,600 ppm, less than 1,500 ppm, less than 1,400 ppm, less than 1,300 ppm, less than 1,200 ppm, less than 1,100 ppm, less than 1,000 ppm, less than 900 ppm, less than 800 ppm, less than 700 ppm, less than 600 ppm, or even less than 500 ppm. The coagulum content may be determined by filtering the aqueous dispersion through a sieve having a mesh size of 44 microns (325 mesh), according to the test method described in the Examples section below.

The aqueous dispersion of the polymer additive of the present invention may be prepared by emulsion polymerization of a monomer mixture that comprises the monomers described above for forming the structural units of the polymer additive, in the presence of a chain transfer agent. The monomer mixture useful in the present invention comprises the ethylenically unsaturated siloxane monomer, the ethylenically unsaturated functional monomer, the additional monoethylenically unsaturated nonionic monomer, and optionally, the multiethylenically unsaturated nonionic monomer. Total concentration of the monomer mixture for preparing the polymer additive is equal to 100%. The monomer mixture may be emulsified and homogenized typically through a homogenizer, prior to polymerization, for example, prior to adding the monomer mixture into in a reaction tank. The homogenization process may be conducted for a certain period of time to minimize coagulum formation during polymerization, thus, to obtain the aqueous dispersion with the low coagulum content. For example, the time for the homogenization process may be, for example, in the range from 1 to 5 minutes or from 3 to 5 minutes.

Examples of suitable chain transfer agents include 3-mercaptopropionic acid, n-dodecylmercaptan (nDDM), methyl 3-mercaptopropionate (MMP), butyl 3-mercaptopropionate, benzenethiol, azelaic alkyl mercaptan, or mixtures thereof. The chain transfer agent may be used in an effective amount to control the molecular weight of the polymer additive. For example, the chain transfer agent may be used in an amount of 0.01% or more, 0.1% or more, 0.5% or more, or even 1% or more, at the same time, 5% or less, 4.5% or less, 4% or less, or even 3.5% or less, by weight based on the total weight of the monomer mixture used for preparing the polymer additive.

The polymerization of the monomer mixture may be conducted by conventional free radical polymerization process well known in the art. Monomers for preparing the polymer additive may be added neat or as an emulsion in water; or added in one or more additions or continuously, linearly or nonlinearly, over the reaction period of preparing the polymer additive, or combinations thereof. Temperature suitable for emulsion polymerization processes may be less than 95 degrees Celsius (° C.), in the range of from 50 to 90° C., or in the range of from 70 to 90° C. In the polymerization process of preparing the polymer additive, free radical initiators may be used. The polymerization process may be thermally initiated or redox initiated emulsion polymerization. Examples of suitable free radical initiators include hydrogen peroxide, tert-butyl hydroperoxide, tert-amyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 1%, or from 0.05% to 0.6%, by weight based on the weight of the monomer mixture. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process, one or more surfactants may be added prior to or during the polymerization of the monomers, or combinations thereof. A portion of surfactants can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; reactive surfactants; ethoxylated alcohols or phenols; and mixtures thereof. The amount of the surfactants used is typically in the range of from 0.1% to 6%, from 0.3% to 3%, or from 0.5% to 1.5%, by weight based on the weight of the monomer mixture used for preparing the polymer additive.

After completing the polymerization, the obtained aqueous dispersion comprising the polymer additive may be optionally neutralized by one or more bases as neutralizers to a pH value, for example, in the range of from 6 to 11 or from 7 to 9. The bases may lead to partial or complete neutralization of the ionic or latently ionic groups of the polymer additive. Examples of suitable bases include alkali metal or alkaline earth metal compounds such as sodium hydroxide, potassium hydroxide, calcium hydroxide, zinc oxide, magnesium oxide, sodium carbonate; primary, secondary, and tertiary amines, such as ammonia solution, triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; and mixtures thereof.

The polymer additive particles in the aqueous dispersion may have a number average particle size in the range of from 50 to 500 nanometers (nm), from 60 to 400 nm, or from 70 to 300 nm, as determined by Brookhaven BI-90 Plus Particle Size Analyzer.

The aqueous dispersion of the polymer additive further comprises water, for example, in an amount of from 30% to 90%, from 40% to 80%, or from 50% to 70%, by weight based on the total weight of the aqueous dispersion.

The present invention also relates to a coating composition, typically an aqueous coating composition, comprising (A) the aqueous dispersion of the polymer additive and (B) an emulsion polymer. The coating composition of the present invention may comprise, by weight based on the total weight of the coating composition, the aqueous dispersion of the polymer additive in an amount of 0.8% or more, 0.9% or more, 1.0% or more, 1.1% or more, 1.2% or more, 1.3% or more, 1.4% or more, 1.5% or more, or even 1.6% or more, and at the same time, 8% or less, 7.9% or less, 7.8% or less, 7.7% or less, 7.6% or less, 7.5% or less, 7.4% or less, 7.3% or less, 7.2% or less, 7.1% or less, 7% or less, 6.9% or less, 6.8% or less, 6.7% or less, 6.6% or less, 6.5% or less, 6.4% or less, or even 6.3% or less. Preferably, the aqueous dispersion of the polymer additive is present in the coating composition in an amount to afford the concentration of structural units of the ethylenically unsaturated siloxane monomer, by weight based on the total weight of the coating composition, in an amount of 0.2% or more, 0.22% or more, 0.25% or more, 0.28% or more, 0.3% or more, 0.32% or more, 0.35% or more, 0.38% or more, or even 0.4% or more, and at the same time, 1.8% or less, 1.7% or less, 1.6% or less, 1.5% or less, 1.4% or less, 1.3% or less, 1.2% or less, 1.1% or less, 1.0% or less, 0.9% or less, 0.8% or less, 0.78% or less, 0.75% or less, 0.72% or less, or even 0.7% or less.

The coating composition of the present invention further comprises one or more emulsion polymer that is usually used as a binder, typically in the form of an emulsion or an aqueous dispersion. The emulsion polymer useful in the present invention has a weight average molecular weight ($M_w$) greater than 25,000 g/mol (i.e., >25,000 g/mol), for example, 30,000 g/mol or more, 60,000 g/mol or more, 80,000 g/mol or more, 100,000 g/mol or more, 200,000 g/mol or more, 300,000 g/mol or more, or even 400,000 g/mol or more. $M_w$ may be determined by GPC analysis using a polystyrene standard. The emulsion polymer particles may have a particle size of from 30 nanometers (nm) to 500 nm, from 70 nm to 300 nm, or from 70 nm to 250 nm. Particle size of the emulsion polymer can be determined by Brookhaven BI-90 Plus Particle Size Analyzer.

The emulsion polymer in the coating composition of the present invention may be selected from an acrylic polymer including an acrylic copolymer and a styrene-acrylic copolymer, a polyurethane-acrylic hybrid polymer, or mixtures thereof. The acrylic polymer useful in the present invention may comprise, by weight based on the weight of the acrylic polymer, from 90% to 99.9% of structural units of the monoethylenically unsaturated nonionic monomer described above such as styrene, butyl acrylate, 2-ethylhexyl acrylate, acetoacetoxyethyl methacrylate (AAEM), or mixtures thereof, and from 0.1% to 10% of structural units of the ethylenically unsaturated functional monomer described above such as acrylic acid, methacrylic acid, phosphoethyl methacrylate, or mixtures thereof.

The coating composition of the present invention may comprise pigments and/or extenders. "Pigment" herein refers to a material which is capable of materially contributing to the opacity or hiding capability of a coating. Such materials typically have a refractive index greater than 1.8. Inorganic pigments typically include metal oxides. Examples of suitable pigments include titanium dioxide ($TiO_2$), zinc oxide, iron oxide, zinc sulfide, anticorrosive pigments such as zinc phosphate and zinc molybdate, carbon black, barium sulfate, barium carbonate and mixtures thereof. $TiO_2$ typically exists in two crystal forms, anastase and rutile. Suitable commercially available $TiO_2$ may include, for example, KRONOS 2310 available from Kronos Worldwide, Inc., Ti-Pure R-706 available from Chemours (Wilmington, Del.), TiONA AT1 available from Cristal, and mixtures thereof. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E opaque polymer available from The Dow Chemical Company (ROPAQUE is a trademark of The Dow Chemical Company), and mixtures thereof. The coating composition may have a pigment volume concentration (PVC) of from zero to 55%, from 5% to 40%, or from 10% to 35%. PVC may be determined according to the following equation:

$$PVC = \frac{\text{Volume of Pigment and extender}}{\text{Dry volume of the coating composition}} \times 100\%.$$

The coating composition of the present invention may comprise one or more defoamer. "Defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates and mixtures thereof. The defoamer may be present, by weight based on the total weight of the coating composition, in an amount of from zero to 5%, from 0.05% to 3%, or from 0.1% to 2%.

The coating composition of the present invention may comprise one or more thickener, also known as "rheology modifier". Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickeners are HEUR, HEC, or mixtures thereof. The thickener may be present, by weight based on the total weight of the coating composition, in an amount of from zero to 8%, from 0.05% to 3%, or from 0.1% to 1%.

The coating composition of the present invention may comprise one or more wetting agent. "Wetting agent" herein refer to a chemical additive that reduces the surface tension of a coating composition, causing the coating composition to be more easily spread across or penetrate the surface of a substrate. Wetting agents may be polycarboxylates, anionic, zwitterionic, or non-ionic. The wetting agent may be present, by weight based on the total weight of the coating composition, from zero to 5%, from 0.05% to 3%, or from 0.1% to 2%.

The coating composition of the present invention may comprise one or more coalescent. "Coalescent" herein refer to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the coating composition, from zero to 30%, from 0.5% to 20%, or from 2% to 10%.

The coating composition of the present invention may comprise one or more dispersant. Dispersants may include nonionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on poly-carboxylic acids (e.g., weight average molecular weight ranging from 1,000 to less than 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the coating composition, in an amount of from zero to 5%, from 0.05% to 3%, or from 0.1% to 1%.

In addition to the components described above, the coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, anticorrosion additives, and grind vehicles. These additives may be present in a combined amount of from zero to 10% or from 0.1% to 2%, by weight based on the total weight of the coating composition. The coating composition may also comprise water in an amount of from 30% to 90%, from 40% to 80%, or from 50% to 70% by weight of the coating composition.

The coating composition of the present invention may be prepared by admixing the emulsion polymer with the aqueous dispersion of the polymer additive, and other optional components, e.g., the pigments and/or extenders. Components in the coating composition may be mixed in any order to provide the coating composition of the present invention. Any of the above-mentioned optional components may also be added to the composition during or prior to the mixing to form the coating composition. When the coating composition comprises pigments and/or extenders, the pigments and/or extenders are preferably mixed with the dispersant to form a slurry of pigments and/or extender.

The coating composition of the present invention can provide coatings made therefrom with improved corrosion resistance. The present invention also provides a method of improving corrosion resistance of a corrosion susceptible substrate, such as metal. The method comprises: applying the coating composition to a metal substrate, and drying, or allowing to dry, the coating composition to form a coating. Improved corrosion resistance means blister rating of "6F" or better and surface rusted rating of "7S" or even better, preferably, "7P", "9S", "9P" or "10", for a coating with a thickness of 40-50 microns (μm) after at least 300 hours of exposure to salt spray according to ASTM B117-2011. The coating composition may provide coatings with good stain removal properties, as indicated by a stain removal score of 65 or more, according to GB/T 9780-2013 test method. Compared to a binder comprising structural units of the ethylenically unsaturated siloxane monomer, the aqueous dispersion of the polymer additive of the present invention can provide higher efficiency in improving corrosion resistance and stain removal properties for the coating composition comprising thereof. For example, to achieve comparable corrosion resistance and stain removal properties, lower concentration of structural units of the ethylenically unsaturated siloxane monomer, based on the weight of the coating composition, is needed for the coating composition of the present invention than a coating composition comprising the binder comprising structural units of the ethylenically unsaturated siloxane monomer.

The present invention also relates to a method of producing a coating on a substrate, preferably an exterior surface, comprising: applying the coating composition to a substrate, and drying, or allowing to dry, the applied coating composition to produce the coating. The coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine protective coatings, general industrial finishes, metal protective coatings, automotive coatings, traffic paints, Exterior Insulation and Finish Systems (EIFS), wood coatings, coil coatings, plastic coatings, can coatings, architectural coatings, and civil engineering coatings. The coating composition is particularly suitable for metal protective coatings and architectural coatings. The coating composition can be used as a primer, a topcoat, as one-coat direct-to-metal coating, or in combination with other coatings to form multi-layer coatings.

The present invention also provides a method of improving corrosion resistance of a metal substrate. The method comprises: providing the coating composition, applying the coating composition to a metal substrate, and drying, or allowing to dry, the coating composition to form a coating with improved corrosion resistance as described above. The present invention also relates to a coated metal article comprising the coating with improved corrosion resistance defined above.

The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (23±2° C.), or at an elevated temperature, for example, from 35 to 60° C.

EXAMPLES

Some embodiments of the invention will now be described in the following Examples, wherein all parts and percentages are by weight unless otherwise specified. The following materials are used in the examples:

DOWSIL 32 Additive (DC-32), available from The Dow Chemical Company, is a methacrylate siloxane monomer having the following structure:

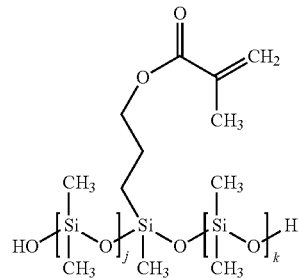

wherein j+k=12~25.

DISPONIL Fes993 surfactant (29%~31% solids content), available from BASF, is a sodium salt of aliphatic polyglycol ether sulfate.

HITENOL AR1025 (25% solids content), available from Dai-ichi Kogyo Seiyaku Co., Ltd., is an ammonium salt of polyoxyethylene styrenated propenyl phenyl ether sulfate.

NATROSOL 250HBR thickener is available from Ashland Aqualon Company.

ACRYSOL™ RM-8W thickener, available from The Dow Chemical Company, is a nonionic urethane rheology modifier.

OROTAN™ 681 (35% solids content) and OROTAN 1288 dispersants (45% solids content), and TRITON™ EF-406 nonionic surfactant (70% solids content) are all available from The Dow Chemical Company.

AMP-95 neutralizer is available from Sinopharm.

Nopco NXZ defoamer is available from Cognis Corporation.

Surfynol TG nonionic wetting agent and Tego Airex 902W defoamer are both available from Evonik.

Ti-Pure R-706 pigment, available from DuPont, is titanium dioxide pigment.

Kaolin clay (DB-80) is available from Shanxi Jinyang Calcined Kaolin Ltd.

CC-700 extender is available from Guangfu Building Materials Group (China).

Wash clay, available from HuiLi (China), is used as an extender.

Binder 1, Binder 2 and Binder 3 are all available from The Dow Chemical Company, where Binder 1 is a 100% acrylic emulsion (solids content: 49.0% and $M_w$: 340,000~360,000 g/mol); Binder 2 is a styrene-acrylic emulsion (solids content: 47.0%, $M_w$: 340,000~360,000 g/mol); and Binder 3 is a styrene-acrylic emulsion (solids content: 47.5% and $M_w$: 90,000~110,000 g/mol).

ROPAQUE™ Ultra E opaque polymer is available from The Dow Chemical Company.

Texanol ester alcohol, available from Eastman, is used as a coalescent.

Propylene glycol is used as an anti-freezing agent.

Sodium nitrite (15%) is used as an anti-flash rust additive.

ACRYSOL, OROTAN, TRITON, and ROPAQUE are all trademarks of The Dow Chemical Company.

The following standard analytical equipment and methods are used in the Examples and in determining the properties and characteristics stated herein:

GPC Analysis

GPC analysis was performed generally by Agilent 1200. A sample was dissolved in tetrahydrofuran (THF)/formic acid (FA) (5%) with a concentration of 2 milligrams (mg)/mL to form a sample solution, which was then filtered through 0.45 µm polytetrafluoroethylene (PTFE) filter prior to the GPC analysis. The GPC analysis was conducted using the following conditions:

Column: One precolumn and Two Mixed B columns (7.8×300 mm); column temperature: 35° C.; mobile phase: THF/FA (5%); flow rate: 1.0 mL/minute; Injection volume: 100 µL; detector: Agilent Refractive Index detector, 35° C.; and calibration curve: PL Polystyrene (PS) Narrow standards (Part No.: 2010-0101) with PS equivalent molecular weights ranging from 2329000 to 162 g/mol.

Coagulum Content of Aqueous Dispersions of Polymer Additives

An aqueous dispersion sample was filtered through a 44 micron sieve. The residue remaining on the sieve was washed with water and put in an oven at 150° C. for 20 minutes. Coagulum content is determined by the dry weight of the residue on the sieve divided by the original wet weight of the aqueous polymer dispersion. The lower the coagulum content, the more stable polymerization process in preparing the aqueous dispersion.

Salt Spray Resistance Test

A coating composition was applied onto Q panels (cold rolled steel) by a 150 µm applicator. The resultant coating film was allowed to dry at 23° C. and relative humility (RH) of 50% for 7 days. Salt spray resistance properties were tested by exposure of the as prepared coated panels to a salt spray environment (5% sodium chloride fog) in accordance with ASTM B117-2011. Exposed cold rolled steel was covered with tape (3M plastic tape #471) prior to exposure. A scribe mark made with a razor blade was scratched into the bottom half of the panels obtained above immediately before exposure. The panels were exposed to the salt spray environment for certain hours, and then removed from the salt spray environment. The surface of the panels was first washed by deionized (DI) water before rating. The results were presented as blister/rust ratings.

Blister ratings were conducted in accordance with ASTM D714-02 (2009) and comprised a number and/or one or more letters, as shown in Table 1. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables 2 and 3. The panels with blister density rating of "6F" or better and "7S" or better are acceptable rating for rust degree, indicating good corrosion resistance of coatings.

TABLE 1

Blister rating criteria

| Density of blister | Abbreviation | Size of Blister | Rating |
|---|---|---|---|
| Few | F | Very Big blister | 2 |
| Medium | M | Big blister | 4 |
| Medium dense | MD | Small to middle blister | 6 |
| Dense | D | Smallest blister seen by unaided eye | 8 |
| | | No blister | 10 |

TABLE 2

Rust Rating by rusting degree

| Rusting degree | Rating |
|---|---|
| Spots | S |
| General | G |
| Pin point | P |

TABLE 3

Rust Rating by surface rusted percentage

| Surface rusted | Rating |
|---|---|
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Stain Removal Evaluation

Films of test coating compositions were drawn down on black vinyl scrub charts with a 150 µm applicator and were dried at constant temperature (25° C.) and humidity (50%) for 7 days before stains applied. Stain removal properties were evaluated according to GB/T 9780-2013 (Test method for dirt pickup resistance and stain removal of film of architectural coatings and paint). Each stain (vinegar, black tea, blue-black ink, water soluble black, alcohol soluble black, and the mixture of Vaseline with carbon black, respectively) was then applied uniformly in the test area with 25 millimeters (mm) width and the length of the chart cross section. Liquid stains were applied over gauze to prevent from running out of the test areas. Stains stayed on the panel to be absorbed for 2 hours before wiped off with dry tissues. The panel was then placed on a scrub tester under 1.5 kilograms (kg) weight with a scrub rate of 37 cycles/min with 1% Aomo powder solution. The panel was scrubbed for 200 cycles, then removed from the tester, rinsed thoroughly under the running water, and hung up to dry. Finally, each cleaned stain area was evaluated by measuring change of reflection index (X):

$$X = \frac{Y_1}{Y_0} \times 100$$

X: Removal ability for each stain measured by reflection index, %;
$Y_1$: Reflection index after completing stain removal test;
$Y_0$: Reflection index before stains applied on the paint film.

According to X of different stains, the score (R) for each stain removal ability can be obtained from the following table:

TABLE 4

Standard of score for each stain removal ability

| R | Vinegar | Black tea | Blue-black ink | Water soluble black | Alcohol soluble black | Mixture of Vaseline and carbon black |
|---|---------|-----------|----------------|---------------------|----------------------|--------------------------------------|
| 10 | 99 < X ≤ 100 | 98 < X ≤ 100 | 96 < X ≤ 100 | 96 < X ≤ 100 | 95 < X ≤ 100 | 99 < X ≤ 100 |
| 9 | 98 < X ≤ 99 | 95 < X ≤ 98 | 91 < X ≤ 96 | 91 < X ≤ 96 | 89 < X ≤ 95 | 98 < X ≤ 99 |
| 8 | 97 < X ≤ 98 | 91 < X ≤ 95 | 85 < X ≤ 91 | 85 < X ≤ 91 | 82 < X ≤ 89 | 97 < X ≤ 98 |
| 7 | 96 < X ≤ 97 | 86 < X ≤ 91 | 78 < X ≤ 85 | 78 < X ≤ 85 | 74 < X ≤ 82 | 96 < X ≤ 97 |
| 6 | 95 < X ≤ 96 | 80 < X ≤ 86 | 70 < X ≤ 78 | 70 < X ≤ 78 | 65 < X ≤ 74 | 95 < X ≤ 96 |
| 5 | 93 < X ≤ 95 | 73 < X ≤ 80 | 61 < X ≤ 70 | 61 < X ≤ 70 | 55 < X ≤ 65 | 93 < X ≤ 95 |
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |

The total score for stain removal ability (R') was calculated as following:

$$R' = \frac{\sum_{i=1}^{6} R_i}{6} \times 10$$

$R_i$: Score of removal ability for each stain;
R': Total score of removal ability for all six stains in the paint film.

The higher score indicates the better stain removal performance. Total score for stain removal being at least 60 is acceptable.

Synthesis of Polymer Additive (PA) Dispersion 1 ("PA Dispersion 1")

A three-liter, five-necked flask equipped with a mechanical stirrer, nitrogen ($N_2$) sweep, thermocouple, and condenser was charged with water (420.00 g) and Fes993 surfactant (1.95 g). The resultant solution in the flask was heated to 86° C. An initiator solution (0.65 g sodium persulfate (SPS) dissolved in 5.00 g water) was added. Two minutes (min) later, a monomer emulsion which was finely stirred by a homogenizer, comprising 2-ethylhexyl acrylate (EHA, 96.00 g), DC-32 (120.00 g), ethyl acrylate (EA, 75.00 g), methacrylic acid (MAA, 9.00 g), n-dodecylmercaptan (nDDM, 9.81 g), and Fes993 surfactant (18.30 g) in water (130.00 g), was fed. Simultaneously, an initiator including SPS (0.53 g) and water (60.00 g) was co-fed while the flask temperature was maintained around 86° C. over a period of 90 min. After the end of the feeds, the reaction was held for 5 min. After cooling to 60° C., a chaser system including ferrous sulfate solution (4.00 g, 0.2% aqueous solution) and tert-butyl hydroperoxide (t-BHP, 1.18 g) in water (5.00 g), as well as isoascorbic acid (IAA, 0.58 g) in water (5.00 g) were added. After holding for 15 min, the same chaser system as above was charged again. Finally, the resultant dispersion was cooled to ambient temperature and filtered through 325 mesh size screen (i.e., 44 micron sieve) to give the PA Dispersion 1 with total solids of 30%.

Synthesis of PA Dispersion A

PA Dispersion A was prepared as synthesis of the PA Dispersion 1 above, except the monomer emulsion comprising EHA (96.00 g), EA (195.00 g), MAA (9.00 g), nDDM (9.81 g), and Fes993 surfactant (18.30 g) in water (130.00 g) was used.

Synthesis of PA Dispersion B

PA Dispersion B was prepared as synthesis of the PA Dispersion 1 above, except the monomer emulsion comprising EHA (180.00 g), DC-32 (30.00 g), EA (75.00 g), MAA (15.00 g), nDDM (9.81 g), and Fes993 surfactant (18.30 g) in water (130.00 g) was used.

Synthesis of PA Dispersion 2

PA Dispersion 2 was prepared as synthesis of the PA Dispersion 1 above, except the monomer emulsion comprising EHA (150.00 g), DC-32 (60.00 g), EA (75.00 g), MAA (15.00 g), nDDM (9.81 g), and Fes993 surfactant (18.30 g) in water (130.00 g) was used.

Synthesis of PA Dispersion 3

PA Dispersion 3 was prepared as synthesis of the PA Dispersion 1 above, except the monomer emulsion comprising EHA (126.00 g), DC-32 (90.00 g), EA (75.00 g), MAA (9.00 g), nDDM (9.81 g), and Fes993 surfactant (18.30 g) in water (130.00 g) was used.

Synthesis of PA Dispersion 4

PA Dispersion 4 was prepared as synthesis of the PA Dispersion 1 above, except the monomer emulsion comprising EHA (102.00 g), DC-32(120.00 g), EA (75.00 g), MAA (3.00 g), nDDM (9.81 g) and Fes993 surfactant (18.30 g) in water (130.00 g) was used.

Synthesis of PA Dispersion D

PA Dispersion D was prepared as synthesis of the PA Dispersion 1 above, except the monomer emulsion comprising EHA (180.00 g), DC-32 (30.00 g), EA (75.00 g), MAA (15.00 g), nDDM (9.81 g), and Fes993 surfactant (18.30 g) in water (130.00 g) was not stirred by a homogenizer before feeding into the flask.

Synthesis of PA Dispersion C

PA Dispersion C was prepared as synthesis of the PA Dispersion 1 above, except the monomer emulsion comprising EHA (60.00 g), DC-32 (60.00 g), EA (45.00 g), MAA (135.00 g), nDDM (9.81 g), and Fes993 surfactant (18.30 g) in water (130.00 g) was used.

Properties of the obtained aqueous dispersions of polymer additives above are given in Table 5. As shown in Table 5, the PA Dispersions 1-4 all showed lower coagulum content, as compared to the PA Dispersion C comprising a higher level of acid structural units and the PA Dispersion D prepared by not utilizing the homogenization process.

TABLE 5

Compositions and properties of polymer additive dispersions

| Polymer additive dispersion | Solids content, % | $M_n$, g/mol | $M_w$, g/mol | Coagulum content, ppm |
|---|---|---|---|---|
| PA Dispersion 1 | 30 | 2659 | 6038 | 300 |
| PA Dispersion 2 | 30 | 3036 | 7551 | 300 |
| PA Dispersion 3 | 30 | 3099 | 7214 | 300 |
| PA Dispersion 4 | 35 | 2631 | 5618 | 1,000 |
| PA Dispersion A | 30 | 3589 | 10749 | 200 |
| PA Dispersion B | 30 | 3517 | 9236 | 200 |
| PA Dispersion C | 30 | | | 15,000 |
| PA Dispersion D | 30 | | | 10,000 |

Examples (Exs) 1-8 and Comparative (Comp) Exs A-C Coating Compositions

The obtained polymer additive dispersions above (e.g., PA Dispersions 1-4, A and B) were used for preparing coating compositions, based on formulations given in Table 6. All ingredients in the grind stage for preparing each coating composition were added sequentially and mixed evenly for 30 min using a high speed disperser at about 1,000 revolutions per minute (rpm) to form the grind. Ingredients in the premix in the letdown stage were mixed first, followed by adding the grind above. Then a PA dispersion was added at the end of the letdown stage based on types and dosage given in Table 7. ACRYSOL RM-8W and water were then further added to obtain the coating compositions. Water loading was adjusted to keep the total weight of each coating composition to 1,000 g. The obtained coating compositions were evaluated for salt spray resistance and results are given in Table 7.

TABLE 6

Coating compositions (40% PVC) for salt spray resistance evaluation

| Material Name | Weight, g |
|---|---|
| Grind | |
| Water | 42.00 |
| OROTAN 681 | 7.80 |
| SURFYNOL TG | 2.00 |
| Aqueous ammonia, 28% aqueous solution | 2.00 |
| TEGO Airex 902W | 0.46 |
| Ti-PURE R-706 | 209.24 |
| Water | 42.00 |
| Subtotal | 305.50 |
| Letdown Premix | |
| Binder 3 | 536.00 |
| TEXANOL ester alcohol | 45.50 |
| Aqueous ammonia, 28% aqueous solution | 4.00 |
| Sodium nitrite, 15% aqueous solution | 13.33 |
| Water | 75 |
| End of premix | 673.83 |
| Subtotal | 979.33 |
| PA dispersion | see table 7 |
| ACRYSOL RM-8W | 2.10 |
| Water | |
| Total | 1000.00 |

As shown in Table 7, the coating compositions of Exs 1-8 comprising 1.67%-6.67% of the PA Dispersion 1, 2, 3, or 4 (by weight based on the total weight of each coating composition) provided coatings with much better salt spray resistance after 300 hours of salt spray exposure than that of Comp Ex A. In contrast, as compared to Comp Ex A and Ex 1, Comp Ex B comprising the polymer additive comprising 10% structural units of DC-32 demonstrated worse salt spray resistance. The coating composition of Comp Ex C comprising 8.89% of the PA Dispersion 3 provided worse salt spray resistance, as compared to Comp Ex A.

TABLE 7

Salt spray resistance properties

| Coating Composition | Comp Ex A | Comp Ex B | Ex 1 | Ex 2 | Ex 3 | Ex 4 | Comp Ex C | Ex 5 | Ex 6 | Ex 7 | Ex 8 |
|---|---|---|---|---|---|---|---|---|---|---|---|
| Polymer additive dispersion | PA Dispersion A | PA Dispersion B | PA Dispersion 2 | PA Dispersion 2 | PA Dispersion 3 | PA Dispersion 3 | PA Dispersion 3 | PA Dispersion 1 | PA Dispersion 1 | PA Dispersion 1 | PA Dispersion 4 |
| Dosage of PA dispersion, g | 16.67 | 66.7 | 33.3 | 66.7 | 22.2 | 44.4 | 88.9 | 16.7 | 33.3 | 66.7 | 57.2 |
| SSR of upper area of scribed panel, 300 h (blister/rust) | 6M/6S | 5D/4G | 8MD/8S | 8D/8S | 8MD/9P | 8M/8S | 2D/2G | 8M/9P | 8F/9S | 10/10 | 8F/9P |

Exs 9-13 and Comp Exs D and E Coating Compositions

The obtained polymer additives dispersions above (e.g., PA Dispersions 1, 4 and A) were used for preparing the coating compositions, based on formulations shown in Table 8. All ingredients in the grind stage for preparing each coating composition were added sequentially and mixed evenly for 30 min using a high speed disperser at about 1,000 revolutions per minute (rpm) to form a millbase, followed by a binder (Binder 1 or 2) and other ingredients including a PA Dispersion in the letdown stage sequentially to give the coating compositions. Dosage and types of binders and PA dispersions are given in Table 9. The obtained coating compositions were evaluated for stain removal resistance and results are given in Table 9.

TABLE 8

Coating compositions (49% PVC) for stain removal evaluation

| Material Name | Weight, g |
|---|---|
| Grind | |
| Water | 200.00 |
| NATROSOL 250HBR | 4.50 |
| AMP-95 | 0.50 |
| OROTAN 1288 | 5.00 |
| NOPCO NXZ | 2.00 |
| TRITON EF-406 | 2.00 |
| Ti-PURE R-706 | 200.00 |
| DB-80 | 120.00 |
| CC-700 | 60.00 |
| Wash clay | 20.00 |
| Subtotal | 614.00 |
| LetDown | |
| Binder | 320.00 |
| ROPAQUE Ultra E | 20.00 |
| NOPCO NXZ | 3.00 |
| TEXANOL ester alcohol | 13.00 |
| Propylene glycol | 10.00 |
| PA dispersion | See table 9 |
| Water | 20.00 |
| Total | 1000.00 |

As shown in Table 9, the coating compositions of Exs 9 and 10 comprising the acrylic silicone hybrid polymer additives provided coatings with improved stain resistance as compared to the coating composition of Comp Ex D. Especially when 2.0% of the PA Dispersion 1 (by weight of the total coating composition) was included, the total score for stain removal of the resultant coating composition of Ex 10 was improved by 5 points comparing with Comp Ex D.

Moreover, the coating compositions comprising the Binder 2 and 1%-2.0% of the polymer additive dispersions (PA Dispersion 1 or 4) also demonstrated improvement on stain removal properties (Exs 11-13), as compared to the coating composition of Comp Ex E.

TABLE 9

Stain resistance properties of coating compositions

| Coating composition | Comp Ex D | Comp Ex E | Ex 9 | Ex 10 | Ex 11 | Ex 12 | Ex 13 |
|---|---|---|---|---|---|---|---|
| Type of PA dispersion | PA Dispersion A | PA Dispersion A | PA Dispersion 1 | PA Dispersion 1 | PA Dispersion 1 | PA Dispersion 4 | PA Dispersion 4 |
| Binder Type | Binder 1 | Binder 2 | Binder 1 | Binder 1 | Binder 2 | Binder 2 | Binder 2 |
| Dosage of PA dispersion, g | 10 | 10 | 10 | 20 | 20 | 10 | 20 |
| Total score for stain removal | 73 | 65 | 76 | 78 | 69 | 68 | 70 |

What is claimed is:

1. An aqueous dispersion of a polymer additive with a weight average molecular weight of from 2,000 to 25,000 g/mol, wherein the polymer additive comprises, by weight based on the weight of the polymer additive,
   (i) from 20% to 85% of structural units of an ethylenically unsaturated siloxane monomer of formula (I), (II), or (III),

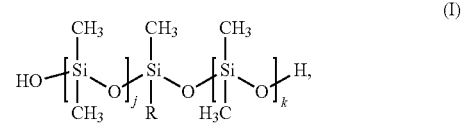

wherein, in formula (I), R is an ethylenically unsaturated group, and j and k are each independently in the range of from 0 to 100, and j+k=5 to 100;

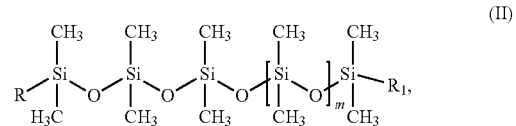

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

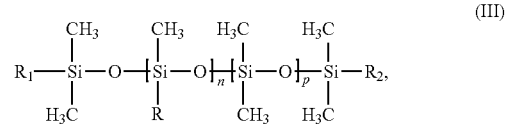

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100;
   (ii) from 0.1% to 10% of structural units of an ethylenically unsaturated functional monomer carrying at least one functional group selected from an amide, ureido, carboxyl, carboxylic anhydride, hydroxyl, phosphorus acid, or sulfonic acid group, a salt thereof, or mixtures thereof; and (iii) from 5% to 79.9% of structural units of an additional ethylenically unsaturated nonionic monomer;

wherein the coagulum content of the aqueous dispersion is less than 2,000 ppm after filtration through a 44 micron sieve.

2. The aqueous dispersion of claim 1, wherein the ethylenically unsaturated siloxane monomer has the structure represented by formula (I), wherein R is $-CH=CH_2,$ $-R_p-OC(=O)CH=CH_2,$ or $-R_p-OC(=O)C(CH_3)=CH_2,$ where $R_p$ is a $C_1$-$C_6$ bivalent hydrocarbon group, and j+k is in the range of from 5 to 50.

3. The aqueous dispersion of claim 1, wherein the polymer additive comprises, by weight based on the weight of the polymer additive, from 20% to 50% of structural units of the ethylenically unsaturated siloxane monomer.

4. The aqueous dispersion of claim 1, wherein the polymer additive comprises, by weight based on the weight of the polymer additive, from 1% to 5% of structural units of the ethylenically unsaturated functional monomer.

5. The aqueous dispersion of claim 1, wherein the polymer additive has a weight average molecular weight of from 5,000 to 10,000 g/mol.

6. The aqueous dispersion of claim 1, wherein the additional monoethylenically unsaturated nonionic monomer is selected from the group consisting of an acrylic monomer, a styrene monomer, a combination of acrylic and styrene monomers, a vinyl ester monomer, a combination of ethylene and vinyl ester monomers, a vinyl silane monomer, or mixtures thereof.

7. A process for preparing the aqueous dispersion of claim 1, comprising:

emulsion polymerization of a monomer mixture in the presence of a chain transfer agent, wherein the monomer mixture comprises, by weight based on the total weight of the monomer mixture, from 20% to 85% of the ethylenically unsaturated siloxane monomer, from 0.1% to 10% of the ethylenically unsaturated functional monomer, and from 5% to 79.9% of the additional monoethylenically unsaturated nonionic monomer, wherein the monomer mixture is emulsified and homogenized prior to polymerization.

8. A coating composition comprising, by weight based on the total weight of the coating composition, (A) from 0.8% to 8% of the aqueous dispersion of claim 1, and (B) an emulsion polymer having a weight average molecular weight greater than 25,000 g/mol.

9. The coating composition of claim 8, wherein the structural units of the ethylenically unsaturated siloxane monomer in the polymer additive is present, by weight based on the total weight of the coating composition, in an amount of from 0.2% to 1.8%.

10. The coating composition of claim 8, comprising from 1% to 7% of the dispersion of the polymer additive, by weight based on the weight of the coating composition.

* * * * *